June 2, 1970   G. STEIN ET AL   3,515,915
TURNING PENDULUM MECHANISM
Filed April 8, 1969   2 Sheets-Sheet 1
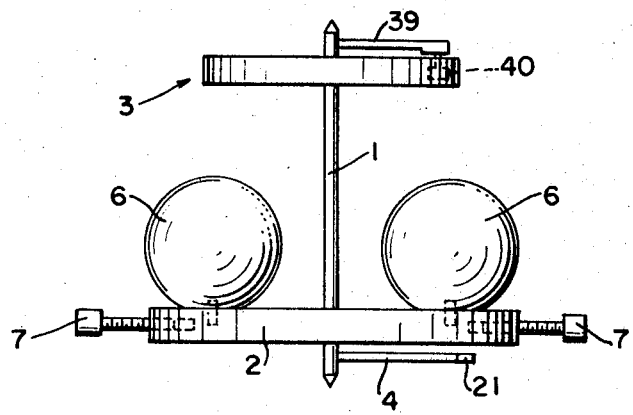
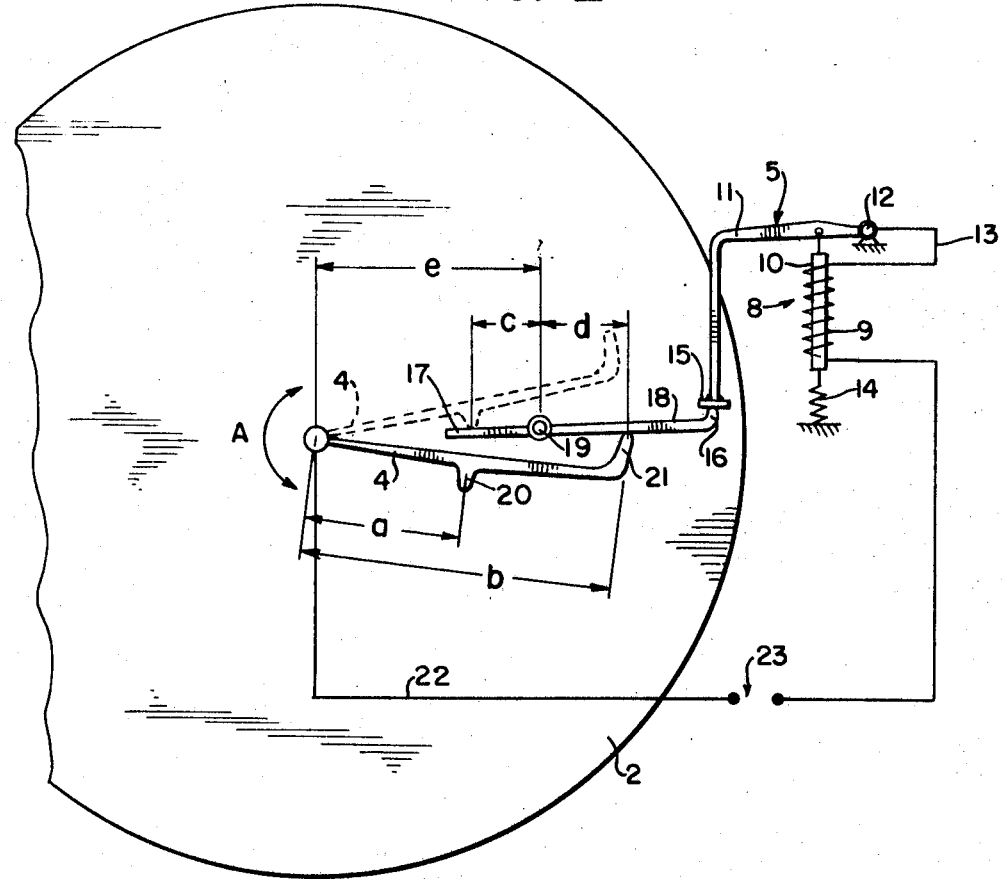
INVENTORS
GUSTAV STEIN
MARGERIT STEIN
BY Darby & Darby
ATTORNEYS

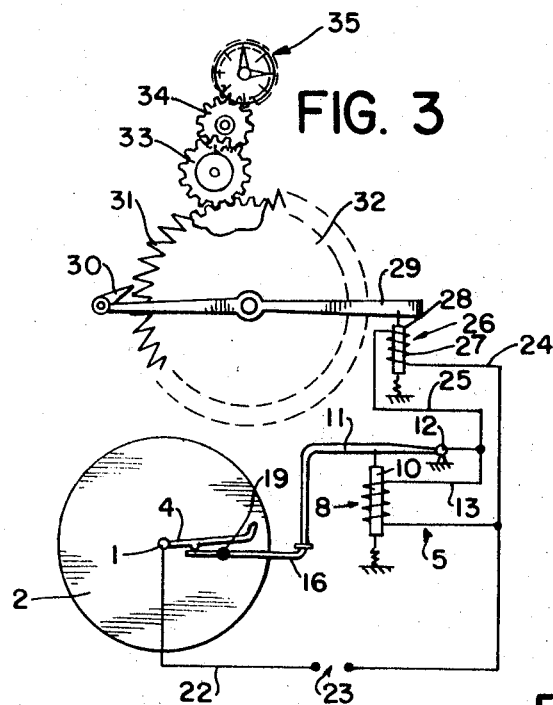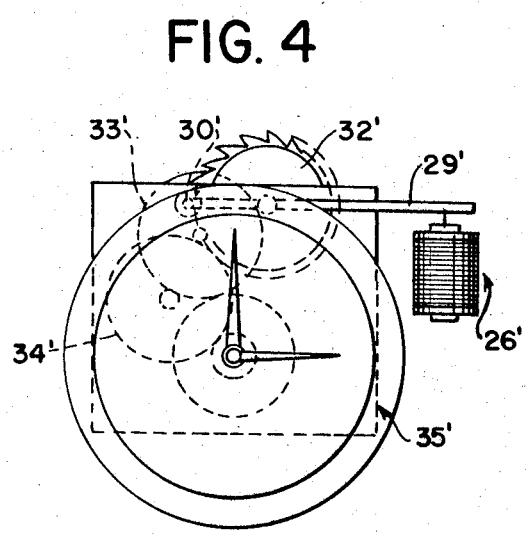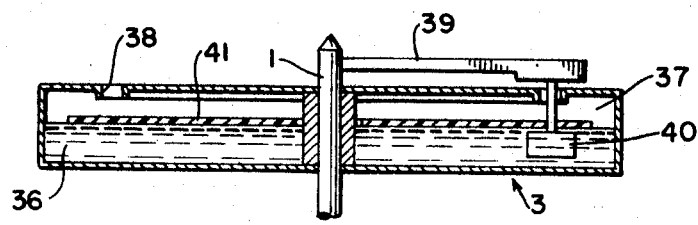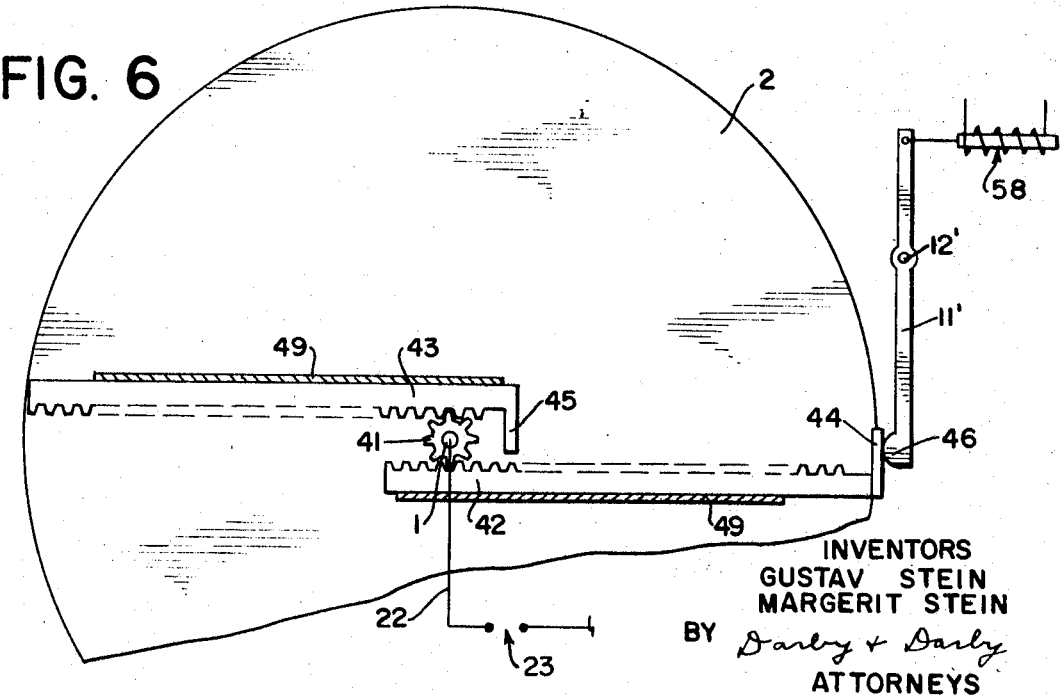

United States Patent Office 3,515,915
Patented June 2, 1970

3,515,915
TURNING PENDULUM MECHANISM
Gustav Stein and Margerit Stein, both of 620 Fort
Washington Ave., New York, N.Y. 10040
Filed Apr. 8, 1969, Ser. No. 814,355
Int. Cl. H02k 33/10
U.S. Cl. 310—39                                    10 Claims

ABSTRACT OF THE DISCLOSURE

A turning pendulum mechanism which is operated by electrical energy in which an energy impulse is given to the turning pendulum approximately once every revolution of its rotation to turn it in opposite directions on alternate rotations.

---

This invention relates to a turning pendulum mechanism and more particularly to a mechanism which is useful for clocks of the wall, table, grandmother and grandfather type, music boxes, etc.

Turning pendulum mechanisms are known in the art. Such mechanisms comprise a weight which, in distinction to the normal swinging pendulum, rotates about a point. Heretofore, such mechanisms have been constructed with the pendulum hanging on a suspension spring or wire and in which the energy impulse to turn the spring or wire, so that the pendulum will rotate, is supplied by the escape wheel of a clocktype mechanism. Such mechanisms, while they are operative, have disadvantages particularly in the fact that the suspension springs or the wires tend to break or be bent thereby adversely affecting the operation of the pendulum.

The present invention relates to a turning pendulum mechanism in which the turning pendulum is connected to a rigid rod or shaft. In accordance with the invention, the pendulum gets an energy impulse through an electromagnet which supplies an energy impulse to the pendulum approximately once every cycle of rotation. A novel arrangement is also provided in which a member which is used to supply energy to the pendulum to turn it, also serves as part of a switching circuit to energize the electromagnet.

It is therefore an object of the present invention to provide a mechanism for a turning pendulum in which the turning pendulum is connected to a rigid shaft.

A further object is to provide a turning pendulum mechanism in which energy is supplied to the turning pendulum by an electromagnet.

A further object is to provide a turning pendulum mechanism in which the turning pendulum is connected to a rigid shaft and energy is supplied through an electromagnet.

Other objects and advantages of the present invention will become more apparent upon reference to the following specification and annexed drawings, in which:

FIG. 1 is an overall schematic view of a turning pendulum according to the invention shown without the energy impulse device;

FIG. 2 is a bottom view of the pendulum of FIG. 1, showing the impulse device;

FIG. 3 is a schematic drawing of an electromagnetic impulse circuit and showing the mechanism adapted for driving a clock movement and the electrical connection of the clock movement with the turning mechanism of the pendulum;

FIG. 4 is a schematic drawing of another type of clock device showing its relationship to the turning pendulum mechanism;

FIG. 5 is a schematic drawing of a damping device for the turning pendulum according to FIG. 1; and FIG. 6 is a view showing another form of mechanism for transferring the energy from the electromagnet to the turning pendulum.

The turning pendulum itself is shown semi-schematically in FIG. 1. It includes a rigid shaft 1 to which is connected near its lower end a disc 2. The shaft 1 is also mounted at its upper and lower ends in suitable bearings (not shown) so that it can readily rotate. Any conventional bearing structure can be used. A damping mechanism 3, to be described in detail below, is connected to the rod 1 near the upper end thereof. A contact arm 4 is mounted on the lower side of the disc 2. The arm 4 serves as the electrical switching member for an energy impulse device and also the energy receiving member by which the pendulum is rotated.

As is also shown in FIG. 1, a pair of balls 6 are fixedly mounted to the disc 2 and serve as the pendulum weights. Adjustable members 7 which are threaded into the disc 2 are provided to regulate the turning speed of the disc. In accordance with well-known principles, as these members 7 are screwed in toward the rod 1, the speed of the disc will increase, and vice versa.

FIG. 2 shows the arrangement for providing the energy to rotate the pendulum of FIG. 1. The energy producing device includes an electromagnet 8 of the solenoid type with a coil 9 and movable core 10. One end of the core is connected by a return spring 14 to a fixed point which can be, for example, the case or base in which the turning pendulum is mounted. This case or base is not shown for the sake of clarity. The other end of the core 10 is connected to an intermediate point on a transfer arm 11, one end of which is pivotally mounted to a fixed pivot point 12 which also can be located on the fixed base or case or at some other appropriate place. The transfer arm 11 is made of electrically conductive material and is illustratively shown as being generally L-shaped with a plate 15 at the end remote from the pivot 12. The transfer lever 11, instead of being a rigid structure, can be a flexible member connected to the core of the solenoid. The end plate 15 engages a nose 16 at one end of a lever arm 18 which is also pivotally mounted at an intermediate point 19 to the fixed support or base. The lever 18 has end 17 which is remote from the nose 16. The lever 18 is also made of electrically conductive material.

The contact arm 4 which also is of electrically conductive material, is mounted to the bottom of the shaft 1 so that as it is moved the shaft and the disc 2 will rotate the lever arm 4. This is shown in FIG. 1. The lever arm 4 has two contact noses 20 and 21 which point in opposite directions with the nose 21 being at the end of the contact arm 4 between the pivot point 19 of the lever 18 and the end plate 15 of the transfer arm 11 and pointed toward the lever 18. The other contact nose 20 points away from the lever 18 and is located between the lever pivot point 19 and the shaft 1. The distance shown as $a$ in FIG. 2 is the distance between the contact nose 20 to the center of the disc or shaft 1. This distance $a$ is such that the nose 20 will contact the end 17 of the lever 18 at a given point when the disc 2 is rotating in a clockwise direction. The contact nose 21 is located at a greater distance $b$ from the center of the disc 2 so that the nose 22 contacts the lever 18 as the disc rotates in a counterclockwise direction. The former is shown by the dotted lines in FIG. 2 and the latter by the solid lines.

The contact arm 4 is electrically connected by a wire 22 with one terminal of a suitable electrical energy source which is indicated by the reference numeral 23. The other terminal of the source 23 is connected to one end of the coil 9 of the electromagnet 8. The circuit is completed through the electrically conductive transfer arm 11, the lever 18 and the contact arm 4. As should be apparent, the circuit is closed by one of the noses 20 or 21 making electrical contact with the lever 18, if the end plate 15 is in contact with the end 16 of the lever.

Considering now the operation of the device, consider that the pendulum 2 is turning in the counterclockwise direction. The contact arm 4 is being rotated with the shaft until its nose 21 engages the lever 18 and causes the end 16 of the lever to come into contact with the end plate 15 of the transfer arm 11. This closes the circuit to the electromagnet 8 and the core 10 is pulled down as seen in FIG. 2. This moves the transfer arm 11 and its end plate 15 down causing the end 16 of the lever 18 to also move downward. This applies a force against the nose 21 of the contact arm 4 and causes the disc 2 to rotate in a clockwise direction. When the disc and the contact arm 4 have rotated counterclockwise by a distance sufficient to break the electrical circuit the core 10 of the solenoid returns to its de-energized position.

The disc continues to rotate in the clockwise direction until its nose 20 engages the end 17 of the lever 18. This pushes the end 16 of the lever 18 upwardly about the pivot 19 so that the lever end 16 engages the transfer arm end plate 15, closing the electrical circuit to apply another energy impulse to the electromagnet. The transfer arm 11 is again pulled down causing the end 17 of the lever 18 to apply a force against the contact arm nose 20 which will cause the disc to rotate in a counterclockwise direction. The disc rotates counterclockwise until the electrical circuit is broken by the contact arm 4 moving from the lever 18. This counterclockwise and clockwise motion continues alternately.

As should be apparent from FIG. 2, the disc 2 rotates a full 360°. This is insured by the appropriate shape and length of the two noses 20 and 21 and their particular relationship on either side of the lever pivot 19.

To insure that the pendulum has the same amount of turning motion in both directions, the following relationship of lengths should be maintained:

$$a:b=c:d$$

The lengths $a$ and $b$ have been defined above. The length $c$ is the distance from the pivot point 19 of the lever 18 to the point where the contact nose 20 engages it. The length $d$ is the distance from the pivot 19 to the point where the nose 21 contacts lever 18. This ratio is maintained without difficulty by the choice of the corresponding distance $e$ between the axis of the pendulum disc and shaft and the pivot 19 of the lever 18. The use of the contact noses and the specific distance chosen between them determines the time at which the electrical circuit closes. These values can be selected and fixed readily so that a highly accurate turning mechanism is provided.

As seen, the contact arm 4 performs a dual function. Not only does it supply the mechanical energy from the electromagnet 8 to turn the disc but it also acts to close the electrical circuit to energize the electromagnet. This double function of the contact arm saves wiring and switching elements in the circuit and makes the construction simpler and more reliable.

If desired, one of the noses 20 and 21 can be removed from the device so that the electrical energy of the magnet 8 provides a turning force in only one direction. In this case, a suitable energy storage arrangement would be used to rotate the disc and shaft in the other direction. This could be, for example, a spring which is compressed and pushes the disc in the reverse direction or, alternatively, a spiral spring which is wound as the disc is being turned in the direction provided by the electromagnet.

FIG. 3 shows in a schematic form one way in which the turning pendulum mechanism of the subject invention can be used with another electromagnetic device to drive a clock movement. The turning pendulum mechanism is as described with respect to FIGS. 1 and 2. Here, the lead from the right-hand terminal of energy source 23 is brought out to both the lower end of the coil of the electromagnet 8 and also to the lower end of a coil 27 of another electromagnetic device 26 through a wire 24. The upper ends of the coils 9 and 28 are both connected to a common point at the pivot 12 and the circuit is completed through the transfer arm 11, the lever 18 and the contact arm 4. The electromagnet 26 has a movable core 28 which is connected to an arm 29 which is pivotally mounted to the shaft of a toothed wheel 32. The free end of the arm 29 carries a pivoted dog 30 whose end rides in the teeth 31 of the wheel 32.

In the arrangement of FIG. 3, each time the disc 2 completes one revolution in either direction the circuit to both the electromagnets 8 and 26 is closed by the contact arm. The action of electromagnet 8 in supplying energy to rotate the disc 2 is described above. With respect to the electromagnet 26, each time that the circuit is closed the arm 29 is pulled down causing the wheel 32 to rotate in a clockwise direction. Due to the use of the dog 30 the wheel 32 is moved only one tooth at a time. The wheel 32 is connected through a suitable gearing arrangement 33 and 34 to the transmission of a clock 35. The gearing is selected so that each revolution of the pendulum 2 moves the clock transmission by a predetermined amount so that an accurate time is kept. Thus, as should be apparent, energy is supplied to both the disc 2 and to the clock mechanism through an electromagnetic arrangement.

FIG. 4 shows another arrangement for driving a clock. Here, the circuit for the electrical components is the same as shown in FIG. 3 so it will not be repeated. In the arrangement in FIG. 4, the drive of the clock mechanism 35' takes up less space than that shown in FIG. 3. As seen, the ratchet wheel 32' as well as the gears 33' and 34' and the clock transmission 35' are located substantially more within and under the face of the clock than in the arrangement shown in FIG. 3. As in FIG. 3, each time that the contact arm 4 of the disc closes the electrical circuit, the electromagnet 26' is energized. This moves the arm 29' up and rotates the wheel 32' which is controlled by a ratchet 30'. The wheel 32' in turn drives suitable gears 33' and 34' which turn the clock movement 35'.

FIG. 5 shows in schematic form the suppressing device 3 which minimizes or prevents vibrations of the turning pendulum. Here, there is a cylindrical container 37 filled with a suitable damping liquid 36. The container 37 has a closed top with an annular ring opening 38 through which a damping vane 40 connected by an arm 39 to the rotating shaft 1 of the pendulum extends into the damping liquid. The arm 39 also passes through a plate 41 which floats on the damping liquid 36 and rotates as the shaft 1 rotates. The plate 41 prevents any liquid from splashing out through the opening 38.

FIG. 6 shows another arrangement for rotating the disc 2. In this arrangement a pinion gear 41 is attached to the bottom of the disc 2 at the center thereof. A pair of ratchet arms 42 and 43 oppose each other and have teeth which mesh with the teeth of the pinion 41. Each of the ratchet arms 42 and 43 is slidably held in a suitable holder or bearing 49 which is attached to a fixed plate or base. The mounting arrangement for the two arms 42 and 43 is such that they are located one above another so that their respective noses 44 and 45 will clear each other as they travel.

To complete the arrangement shown in FIG. 5, an electromagnet 58 is provided. The core of the electromagnet is connected to one end of a transfer arm 11' which is pivoted about point 12. The other end of the transfer arm 11' has a nose 46 which is adapted to engage the noses 44 and 45 of the ratchet arms. An electric connection is taken off by means of a suitable slip ring or commutator (not shown) from the pinion 41. The pinion 41, the arms 42 and 43 and the transfer arms 11' are all of electrically conductive material. The arrangement of the circuit is such so that when one of the noses 44 or 45 of the ratchet arms engages the nose 46 of the transfer arm 11' the circuit will be closed and the electromagnet energized in a manner such that its core will move into the coil (to the right as shown in FIG. 6).

As the disc 2 is moving counterclockwise as viewed in FIG. 6, the arm 42 is moving to the right and the arm 43 to the left. The clockwise movement continues until the nose 44 of the arm 42 engages the nose 46 of a transfer arm 11' and thereby closes the electrical circuit. The core of the electromagnet 50 will move toward the right so that the nose 46 of the transfer arm will impart a motion to the ratchet arm 42, causing it to move to the left. This will cause the pinion gear 41 to rotate in a clockwise direction and carry with it the shaft 1 and the connected disc 2. As the disc rotates in the clockwise direction, the circuit is broken to the electromagnet causing the core to assume its de-energized state. The clockwise motion continues and the two ratchet arms move in opposite directions with respect to each other until finally, after about 360° of rotation, the nose 45 of the arm 43 engages the nose 46 of the transfer arm 11'. At that time the electrical circuit is again closed and the electromagnet core moves to the right causing the transfer arm 11' to impart a motion to the ratchet arm 43. This starts the disc 2 rotating in a counterclockwise direction until the nose 44 of contact arm 42 engages the transfer arm 11 to again close the electrical circuit which will start the disc rotating back in the clockwise direction.

As should be apparent, the turning pendulum mechanism of the present invention is not limited to clocks. It can also be used with music box movements, chimes, or other similar devices. The mechanism is particularly adapted to this in view of the fact that the exact turning arc can be regulated by a suitable selection of the distances $a, b, c, d$ and $e$.

With respect to the clock embodiments shown in FIGS. 3 and 4, instead of using the electrical current and an electromagnet as a clock drive mechanism, other electrical and electronic devices can be used to turn the clock mechanism, these devices being actuated by a closing of the circuit to the electromagnetic devices 26 or 26'.

Also, instead of using an electromagnet of the solenoid type such as shown in the drawings in which the core has a linear movement, other types of electromechanical devices can be used to provide the energy impulse to the contact arm 4 or the ratchet arms.

What is claimed is:

1. In combination a rotatable turning pendulum mechanism including a shaft, said turning pendulum mechanism for rotating a predetermined arc of travel in a first direction and then rotating back over said arc of travel in a second direction opposite said first direction, and electrically operated means including an electromagnet for imparting a rotational force to said turning pendulum mechanism to reverse its direction of travel at the end of the arc of travel in each said direction, power supply means connected in circuit with said electromagnet, and switching means carried by said turning pendulum mechanism for closing the circuit between said electromagnet and said power supply means at the end of the arc of travel of said mechanism in each direction.

2. Apparatus as in claim 1 wherein said switching means, carried by said turning pendulum mechanism comprises a portion of said force imparting means.

3. Apparatus as in claim 2 wherein said force imparting means further comprises a transfer arm connected to said electromagnet, a pivoted lever adapted to be engaged by the transfer arms and said switching means on said turning pendulum mechanism includes an electrical contact arm.

4. Apparatus as in claim 3 wherein said contact arm includes first and second contact members facing in opposite directions, said first and second contact members respectively contacting said lever arm on different sides of the pivot point of said lever on alternate revolutions of said rotating member.

5. Apparatus as in claim 1 wherein said force imparting means comprises engaging means on said shaft and first and second means mating with said engaging means and adapted to move in opposite directions.

6. Apparatus as in claim 5 wherein said engaging means includes a gear, said first and second rack means having teeth thereon meshing with said gear, and switching means carried by each of said first and second rack means for closing the electrical circuit on alternate revolutions of the rotatable member.

7. Apparatus as in claim 6 wherein said switching means carried by each of said first and second rack means comprises a contact member, said contact members moving in opposite directions during each revolution of said rotatable member.

8. Apparatus as in claim 5 wherein each of said first and second means forms a portion of said switching means.

9. Apparatus as in claim 1 further comprising means for damping the rotation of said rotatable member, said damping means including a tank containing a liquid and, means attached to said shaft for rotation therewith and disposed in said liquid.

10. Apparatus as in claim 1 further comprising energy transmission means for operating a sequential mechanism, and second electrically operated means, and means for operating said second electrically operated means by said switching means.

References Cited

UNITED STATES PATENTS

| 2,873,572 | 2/1959  | Gibbs et al. | 58—41 |
| 2,129,882 | 9/1938  | Shattuck et al. | 310—39 XR |
| 1,961,320 | 6/1934  | Worrall | 58—41 XR |
| 2,617,951 | 11/1952 | Jeffrey | 310—35 |
| 2,428,247 | 9/1947  | Scott et al. | 310—39 |
| 3,207,965 | 9/1965  | Lavet | 318—128 |
| 1,619,677 | 3/1927  | Pierce | 310—19 |
| 2,796,728 | 6/1957  | Knudsen | 310—39 XR |
| 2,724,063 | 11/1955 | Coley | 310—39 |

WARREN E. RAY, Primary Examiner

B. A. REYNOLDS, Assistant Examiner

U.S. Cl. X.R.

58—41; 318—134